Sept. 29, 1970     T. A. KLYCE     3,531,034
SPEED CONTROL APPARATUS
Filed Feb. 10, 1969
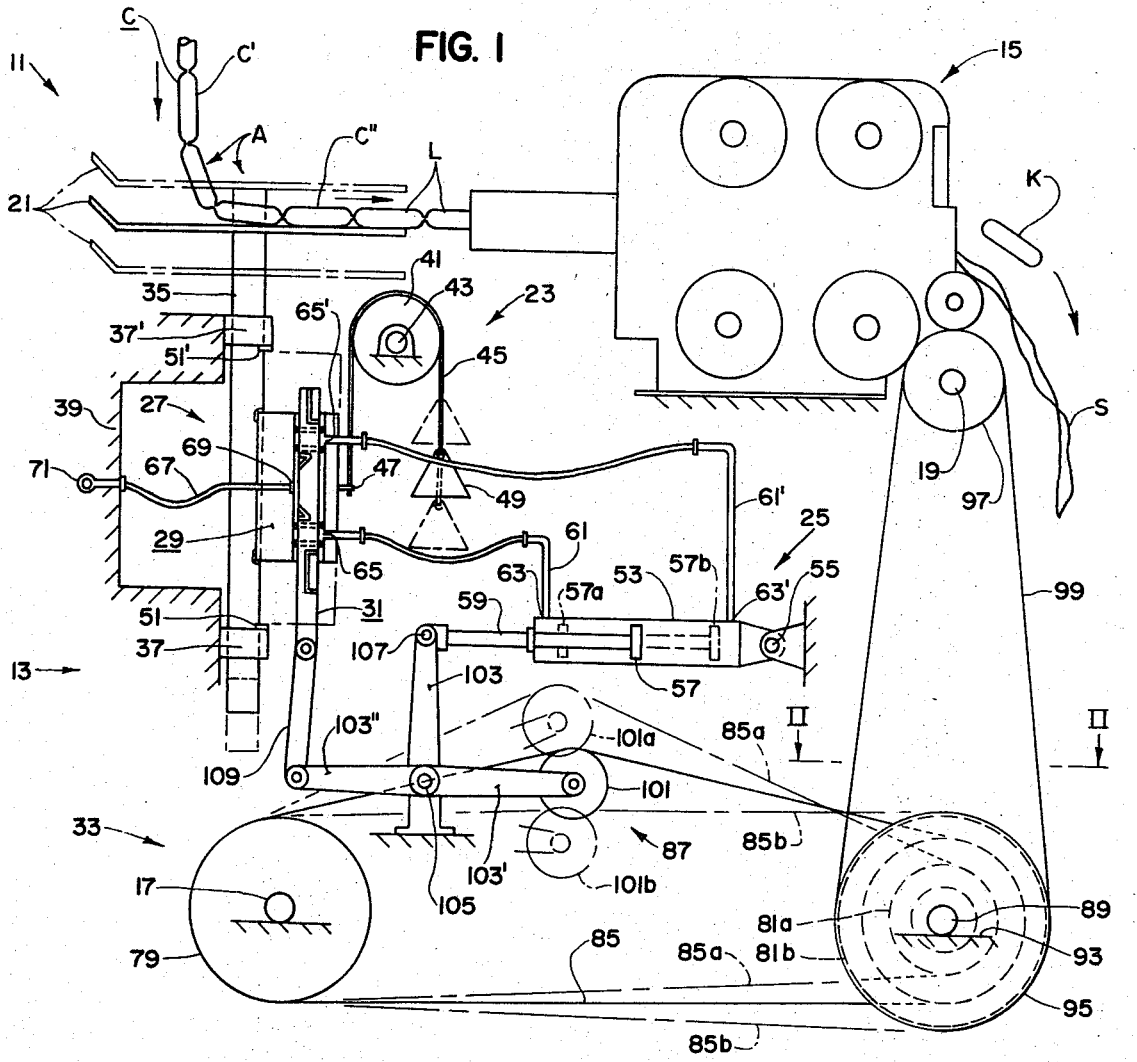
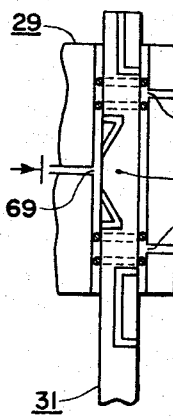
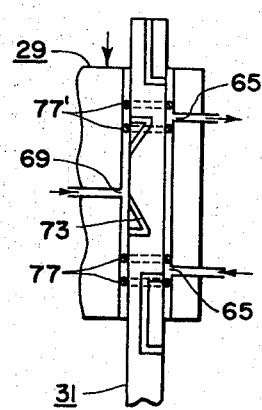
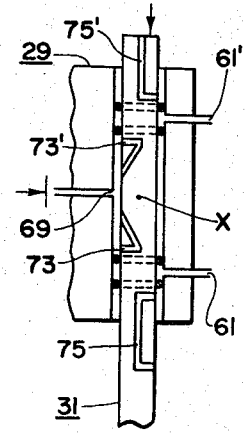
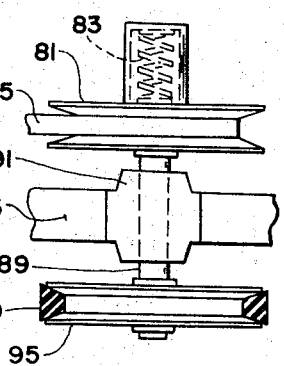
INVENTOR.
THOMAS A. KLYCE
BY John R. Walker, III
Attorney

United States Patent Office 3,531,034
Patented Sept. 29, 1970

3,531,034
SPEED CONTROL APPARATUS
Thomas A. Klyce, Memphis, Tenn., assignor to Ranger Tool Co., Inc., Ellendale, Tenn., a corporation of Tennessee
Filed Feb. 10, 1969, Ser. No. 797,901
Int. Cl. A22c 21/00
U.S. Cl. 226—26                    7 Claims

ABSTRACT OF THE DISCLOSURE

Infinitely variable speed control means for controlling the speed of a machine in response to the amount or weight of accumulated work material on the infeed side of the machine. The speed control apparatus includes a floating counterweight balanced pan adapted to receive work material; variable speed change mechanism arranged in the power transmission means driving the machine; and, fluid actuator and control valve means for actuation of the speed change mechanism in response to upward and downward movement of the pan. An accumulation of work material in the pan, over or under a predetermined weight of work material, is effective for causing respectively downward or upward movement of the pan. Downward movement of the pan is operative through the fluid actuator and control valve means of the apparatus for powered actuation of the speed change mechanism to a faster speed and thus, actuation of the machine to a faster speed; an upward movement of the pan, as a result of a lessening of the accumulation and weight of the work material on the pan being effective for causing a decrease in speed of the machine.

BACKGROUND OF THE INVENTION

Field of the invention

It relates to speed control means and particularly relates to such means for controlling the speed of a machine in response to the input or output of product or work material respectively being conducted into or away from the machine.

Description of the prior art

There have hertofore been control apparatus for controlling the speed of a traveling web of material such as a web of fabric material. Pats. Nos. 2,792,615 and 2,796,086 show such control apparatus. In the apparatus disclosed in Pat. '615 and the first embodiment (FIG. 1) of '986, the weight of the accumulated fabric work material actuates friction wheel means engaging a continuous constant speed belt for effecting output of the accumulated work material.

The second embodiment (FIG. 2) of Pat. '086 utilizes the weight of the accumulated work material to position a variable speed pulley to control the speed of the machine. While these control apparatus might function satisfactorily for a continuous sheet or web of material having a thereof, it is believed that such apparatus are not adapted or suitable for controlling a machine having a continuous work product of uneven weight along the length thereof or which is substantially heavier than a sheet of work material. As for example, it would not be suitable for controlling the speed of a machine handling a chain of ling sausages since the sausages are much heavier than a sheet of material and since the sausage chain is inconsistent in weight along the length thereof, which would tend to overcorrect or to cause a "hunting" erratic effect.

SUMMARY OF THE INVENTION

The speed control apparatus of the present invention provides an accurate control of a machine in response to the infeed or outfeed accumulation or weight of work material entering or leaving the machine. The present invention provides means for eliminating overcorrection or erratic changes in the speed of the machine and is especially adapted to be used with work products which are not entirely consistent in weight along the length there. The present invention includes a floating counterweight means balanced to a desired accumulation of work material, in conjunction with power operative infinitely variable speed change means and control valve means so related to the other parts that it causes the corrections to be made in increments, thereby preventing overcorrection or erratic changes.

BRIEF DESCRIPTION OF THE DRAWING

FIG. 1 is a schematic view of the speed contol apparatus of the present invention shown as being applied in a link sausage processing installation and as being used in controlling the input or infeed of a sausage peeling machine.

FIG. 2 is a horizontal plane sectional view of the variable pitch driven pulley means of the infinitely variable speed change mechanism of the invention, taken as on the line II—II of FIG. 1.

FIGS. 3a, 3b, and 3c illustrate schematically in consecutive order the actuation of the fluid flow control valve means of the apparatus.

DESCRIPTION OF THE PREFERRED EMBODIMENT

The speed control means of the present invention is indicated by numeral 11 and will be described in conjunction with link sausage processing apparatus 13 including a sausage peeling machine 15. Sausage processing apparatus 13 includes power transmission means including a main drive shaft 17 transmitting power through means later to be described into input shaft 19 of machine 15. For clarity in description, the chain C of sausage links L will be considered as being processed continuously by sausage peeling machine 15; the sausage chain will be considered as being processed by peeling machine 15 into a string of meat-free casings S and meat kernels K. Sausage chain C will be considered as being moved continuously by elevating arranged conveyor means (not shown) and as forming a vertically downwardly moving chain portion C' and a horizontally moving chain portion C".

Speed control means 11 basically includes horizontal pan structure 21 adapted for receiving the bight or accumulation A of sausage chain C; means guidingly constraining pan 21 in upward and downward movement; counterweight means 23 exerting a predetermined upward force on pan 21; fluid powered actuator means including a piston-cylinder unit 25; fluid flow directional control valve means 27 including a valve body 29 and valve control rod 31; and, infinitely variable speed change mechanism 33 interposedly arranged between main drive shaft 17 and input shaft 19 of sausage machine 15.

The means guidingly constraining pan structure 21 in vertical movement preferably includes column structure 35 slidably received in lower and upper bearing means 37, 37' secured respectively on stationary support structure 39. Counterweight means 23 is adapted for supporting a predetermined amount or weight of sausage product work material chain C and preferably includes a counterweight wheel 41 journaled on a horizontal axis 43; a length of wire rope 45 trained over wheel 41 and fixedly attached at point 47 to control valve body 29; and a weight mass 49 pendantly attached to the free end of rope 45. The size or weight of weight mass 49 may be varied or adjusted for adjusting the amount or accumulation A of sausage chain C supported by pan structure 21. Preferably, the size or weight of counterweight mass 49 is adjusted to a desired mean weight or accumulation of the sausage chain on the pan when infinitely variable speed change mechanism 33 is at an intermediate or mean disposition and thus the speed and output of machine 15 is arranged at an intermediate or mean disposition.

Valve body 29 is preferably fixedly secured on column 35 so that vertical bidirectional actuation of pan 21 preferably causes corresponding bidirectional vertical movement of valve body 29. Stop lugs 51, 51' secured respectively on lower and upper bearing structures 37, 37' engage upper and lower surface portions respectively of valve body 29 and define stop means for limiting respectively the downward and upward movement of pan-valve body-column assembly 21, 29, 35.

Piston-cylinder unit 25 is of typical double-acting type and includes a cylinder 53 having its base end pivotally secured on stationary structure by pin means 55 and includes a piston 57 and piston rod 59. Conduits 61, 61' communicate respectively port openings 63, 63' of piston-cylinder unit 25 with port openings 65, 65' of valve body 29. A conduit 67 communicates a port opening 69 of valve body 29 with a pressurized fluid supply conduit 71, preferably air pressure.

Control valve 27 is a three-position type valve having a closed center neutral position and upper and lower positions operative respectively for energizing one or the other side of piston 57 of piston-cylinder actuator unit 25. Control rod 31 of valve 27 includes structure defining pressure passageways 73, 73' and exhaust passageways 75, 75' (see FIG. 3c) symmetrically arranged respectively with respect to a point X on the longitudinal extension of the control rod. Rubber O-rings 77, 77; 77', 77' are stationarily fitted in valve body 29 in paired arrangements respectively on opposite sides of port openings 65, 65' of valve body 29. Without considering passageways 73, 73'; 75, 75' of control rod 31, O-rings 77, 77; 77', 77' are adapted to respectively isolate each of port openings 65, 65', 69.

In the functioning of control valve 27, as valve body 29 moves downwardly relative to control rod 31, upper control rod passageway 73' communicates pressurized fluid from port opening 69 to port opening 63' and energizes piston-cylinder unit 25 on the right side of piston 57 (as viewed in FIG. 1). Simultaneously therewith, the above mentioned downward movement of valve body 29 communicates exhaust passageway 75 of control rod 31 with valve body port opening 65, thereby permitting exhaust fluid from the left side of piston 57 to exhaust through conduit 61, exhaust passageway 75, and into the atmosphere (see also FIG. 3b). Upward movement of valve body 29 relative to valve control rod 31 causes action contrary to the above-described action. Thus, upward movement of valve body 29 energizes piston-cylinder unit 25 on the left side of piston 57 and exhausts the fluid from the right side of the piston.

The infinitely variable speed change means 33 preferably includes a constant pitch drive pulley 79 fixedly secured on main drive shaft 17; a variable pitch driven pulley 81 yieldably urged by spring means 83 constantly to a large pitch diameter disposition; a V-belt drive belt 85 drivingly interconnecting drive and driven pulleys 79, 81; and belt tensioning means 87 operative respectively for increasing or decreasing the tension of drive belt 85 and respectively causing an increase or decrease in the r.p.m.'s of machine 15. Drive and driven pulleys 79, 81 preferably are journaled in spaced apart arrangement and with variable pitch pulley 81 being keyed to a horizontal countershaft member 89 journaled in bearing means 91 supported on horizontal support structure 93 (see FIGS. 1 and 2). Pulley and belt means 95, 97, 99 interconnect respectively countershaft 89 of variable speed change means 33 and input shaft 19 of sausage peeling machine 15.

Belt tensioning means 87 preferably includes an idler pulley 101 adapted for runningly engaging the upper run of drive belt 85. Linkage means including rigidly connected L-shaped lever arm structures 103, 103' guidingly constrain idler pulley 101 in vertical arced movement about pivot axis means 105. Pin means 107 pivotally connects lever arm 103 with piston rod 59 of actuator unit 25. L-shaped journaled lever structure 103, 103' and piston rod structure 59 provide positive drive means interconnecting piston 57 of actuator unit 25 and idler pulley 101. Bidirectional movement of actuator unit piston 57 toward the left or right (as viewed in FIG. 1) is operative respectively for increasing or decreasing the tension of drive belt 85 thereby respectively decreasing or increasing the effective pitch diameter of variable pitch driven pulley 81 and thereby respectively increasing or decreasing the speed of sausage peeling machine 15.

Actuator unit 25 and variable speed change means 33 respectively are shown in FIG. 1 in broken and full lines: The piston 57 of unit 25 is illustrated in full lines and as being in a mean or intermediate disposition; in like manner, variable pitch driven pulley 81, drive belt 85, and idler pulley 101 each are illustrated in full lines in mean or intermediate dispositions. Pressurizing the right side of piston 57 of actuator unit 25 moves piston 57 toward the left and to a position indicated 57a; moves idler pulley upward to position indicated 101a; and arranges drive belt 85 and variable pitch driven pulley 81 respectively in positions indicated 85a, 81a. Movement of piston 57 to a position indicated 57b causes downward movement of the idler pulley to a position 101b and moves the variable speed drive belt and driven pulley respectively to positions indicated 85b, 81b. Fluid pressurized movement of piston 57 to the left is operative for decreasing the effective diameter of pulley 81 thereby increasing the speed of machine 15; in like manner, pressurized movement of piston 57 to the right decreases the effective diameter of pulley 81 and increases the speed of machine 15.

Lever and link means 103", 109, in conjunction with lever 103 and piston rod 59 interconnect piston 57 with valve control rod 31 and provide means for transmitting positive movement motion between the valve control rod and the piston of actuator unit 25. It will be understood that levers 103, 103' and 103" are rigidly interconnected for pivot about pivot axis means 105. Mechanical linkage means 103, 103', 103", 105, 107 and 109 mechanically interconnect, in positive drive movement, idler pulley 101 of belt tensioning means 87 and control rod 31 of valve means 27.

The relative proportions and arrangement respectively of ported valve body 29 and control rod 31; actuator unit 25; and linkage mechanism 103, 103', 103", 105, 107 is such that upward or downward movement of pan structure 21 and thus valve body 29 is operative for causing substantially sequential or cyclic function and somewhat a power booster effect: Downward or upward movement of valve body 29 relative to control rod 31 initiates somewhat sequential action in energizing actuator unit 25, thereby actuating belt tensioning means 87 and move control rod 31 to a neutral closed center disposition. In other words, the action of unit 25 is fed back to valve 27, so that the correction in the speed of machine 15 is made in short increments, thereby eliminating overcorrection or "hunting" of the machine speed. Stated another way, valve 27 gives a "shot" of fluid to unit 25, but only a shot, since the flow of fluid is cut off almost immediately by the movement of control rod 31 caused by the movement of piston 57.

The following actions may be considered as being carried out as valve body 29 is moved downwardly by an accumulation of work material sausage porducts on pan 21 of weight sufficient for overcoming the weight of counterweight mass 49: Considering that the various components of speed control means 11 are arranged at an intermediate or mean disposition (full line showing in FIGS. 1 and 3a) and considering further that the apparatus is operative and machine 15 is running at an intermediate or mean speed, downward movement of valve body 21 relative to stationary valve control rod 31 pressurizes port opening 65' in valve body 29, pressurizes the right side of piston 57 urging the piston to the left thereby simultaneously moving idler pulley 101 upwardly, increasing the speed of driven pulley 81 and the speed of machine 15, and simultaneously moves control valve rod 31 downwardly closing off port openings 65, 65' and arranging valve means 27 in an intermediate neutral closed port disposition. FIGS. 3a, 3b, 3c illustrate in consecutive order the above-described sequential actions as valve body 29 is moved downwardly from the position shown in FIG. 3a to the position shown in FIG. 3b. FIG. 3c illustrates the reactive downward movement of control rod 31 for closing off conduit passages 61, 61' between the control valve and the actuator unit. Upon further downward movement of valve body 29 the sequential actions shown in FIGS. 3a, 3b, 3c will be repeated in cyclic fashion and will be repeated again until the increased speed of the machine removes the accumulation of sausage chain C' from pan 21 and permits counterweight mass 49 to balance and halt the downward movement of valve body 29. Thus, it will be seen the correction of the speed of the machine takes place in short increments. Should the accumulation of sausage product on the pan 21 be less than counterweight mass 49, valve body 29 will be moved upwardly relative to control rod 31 and in like manner, the sequential or cyclic actions will occur for causing a decrease in the speed of machine 15. At optimum operating conditions, the downward inflow rate of sausage chain portion C' is such that variable pitch drive pulley 81 is at an intermediate or mean disposition and machine 15 is operating also at an intermediate and mean speed. In optimum operating conditions and when the infeed of sausage chain portion C' is balanced with optimum operating speed of machine 15, directional flow control valve 27 is in a neutral closed center disposition and the apparatus in arranged as shown in FIG. 1 of the drawing.

I claim:

1. Speed control apparatus for controlling the speed of a machine in response to an accumulation of work material comprising means for receiving the work material and movable responsive to the weight of the work material, variable speed means adapted to be operably coupled to a machine, control valve means coupled to said means for receiving the work material and operative in response to movement thereof, actuator means operably coupled to said variable speed means and to said control valve means for changing said variable speed means in response to said control valve means to change the speed of a machine, and feedback means operably coupled between said actuator means and said control valve means for causing said control valve means to change said variable speed means in short increments.

2. In manufacturing apparatus including a material processing machine having a power input shaft and with said apparatus including mechanical power transmission means adapted for driving said machine through said power input shaft, and including material supply means adapted for substantially continuously supplying work material controlling the operating r.p.m.'s of the machine comprising a pan adapted to receive work material from the supply means, means guidingly constraining the pan in upward and downward movement, counterweight means adapted for exerting a predetermined upward force on said pan, infinitely variable speed change means interposedly arranged in said power transmission means including a drive pulley, a driven pulley, belt means runningly interconnecting said drive and driven pulley, and including means for varying the r.p.m. ratio between the drive and driven pulleys including means for increasing and decreasing the speed of said driven pulley, a fluid powered double acting actuator, pressurized fluid supply means, conduit means communicating said actuator to said fluid supply means, fluid flow directional control valve means, arranged in said conduit means, of the three-position type having a closed center position and first and second positions arranged respectively on opposite sides of said closed center position for energizing said actuator bidirectionally, positive movement transfer means interconnecting said control valve and said pan, positive movement transfer means interconnecting said actuator and said means for varying the r.p.m. ratio between the drive and driven pulleys of said speed change means, said speed control apparatus being operative in an optimum disposition with said pan being balanced at a mean elevational position, with said speed change means driven pulley at a mean disposition and with said control valve being in a closed disposition, downward movement of said pan being operative for causing action of said actuator in one direction and an increase in speed of said driven pulley, upward movement of said pan being operative for causing action of said actuator in the other direction and a decrease in speed of said driven pulley, and including means substantially simultaneously operative respectively with the upward or downward movement of said pan for causing said control valve to be arranged in a centered disposition and for stopping the speed change action of said variable speed change means.

3. The speed control apparatus as defined in claim 2 wherein said counterweight means is operative for exerting a predetermined upward force on said pan at infinitely variable elevational positions of said pan and includes a stationarily journaled wheel, a length of rope trained over the wheel having one end portion thereof attached to the valve body, and including a weight mass pendantly attached to the other end of said rope.

4. In manufacturing apparatus including a material processing machine having a power input shaft, and with said apparatus including mechanical power transmission means adapted for driving the machine through said power input shaft, and including material supply means adapted for supplying work material to the infeed side of the machine; speed control apparatus for controlling the operating r.p.m.'s of the machine comprising a pan adapted to receive work material from the supply means, means guidingly constraining the pan in upward and downward movement, counterweight means adapted for exerting an upward force on said pan, a double-acting fluid powered piston-cylinder unit, means stationarily securing the cylinder part of said piston-cylinder unit relative to said machine, pressurized fluid supply means, fluid conduit means communicating said piston-cylinder unit and said fluid supply means, fluid flow directional control valve means interposedly arranged in said conduit means for flow direction control of fluid energizing said piston-cylinder unit including a valve body and a control rod coactingly operative in relative linear movement, means connecting said valve body in positive movement connection to said pan, means connecting said valve control rod and the piston of said piston-cylinder unit in positive movement connection, said control valve being a three-position type valve having a closed center neutral position and a position on opposite sides of the center position, upward and downward movement of said valve body in response to varying weight of work material on said pan being operative for pressurizing one or the other side of the piston of said piston-cylinder unit, and including infinitely variable speed change means interposedly arranged in said power transmission means connected in positive drive connection with the piston of said piston-cylinder unit and responsive to bidirectional movement of said piston in causing an increase or decrease in speed of the input shaft of said machine, a downward or upward movement of said pan causing respectively an increase and decrease in the speed of the machine.

5. The speed control apparatus as defined in claim 4 wherein said means interconnecting said control rod of said valve means and the piston of said piston-cylinder unit includes mechanical lever and link means for transmitting positive movement motion between said control rod and the piston of said piston-cylinder unit.

6. The speed control apparatus as defined in claim 4 wherein said speed change means includes a constant pitch drive pulley, a variable pitch driven pulley including spring means constantly urging said pulley to a large pitch diameter slow speed disposition, a drive belt drivingly interconnecting said drive and driven pulleys, and belt tensioning means connected in positive drive connection with the piston of said piston-cylinder unit and operative upon bidirectional movement of said piston respectively for tensioning and loosening said drive belt respectively causing small and large pitch diameter of said variable pitch driven pulley respectively causing an increase or decrease in r.p.m.'s of the machine.

7. The speed control apparatus as defined in claim 6 wherein said drive and driven pulleys are relatively stationarily journaled in spaced apart arrangement, and wherein said belt tensioning means includes a belt tensioning idler pulley runningly engaging a belt run of the drive belt, means journaling said pulley and guidingly constraining the axis of said pulley in movement transversely of said belt run, and including positive drive connecting means interconnecting the piston of said piston-cylinder unit with said idler pulley for moving said idler pulley transversely of said belt run and adjustably tensioning said belt.

References Cited
UNITED STATES PATENTS

| | | | |
|---|---|---|---|
| 2,750,679 | 6/1956 | Cohn et al. | 226—26 X |
| 2,792,615 | 5/1957 | Cohn et al. | 226—20 X |
| 2,797,086 | 6/1957 | Cohn et al. | 226—26 |

ALLEN N. KNOWLES, Primary Examiner

U.S. Cl. X.R.

17—49